(12) United States Patent
Goettsch

(10) Patent No.: US 8,903,832 B2
(45) Date of Patent: Dec. 2, 2014

(54) METHOD AND SYSTEM FOR PROVIDING A VIRTUAL JOB MARKET

(75) Inventor: Christian Goettsch, Munich (DE)

(73) Assignee: Experteer GmbH, Munich (DE)

( * ) Notice: Subject to any disclaimer, the term of this patent is extended or adjusted under 35 U.S.C. 154(b) by 594 days.

(21) Appl. No.: 12/451,202

(22) PCT Filed: Apr. 30, 2008

(86) PCT No.: PCT/EP2008/003524
§ 371 (c)(1),
(2), (4) Date: Oct. 30, 2009

(87) PCT Pub. No.: WO2008/131969
PCT Pub. Date: Nov. 6, 2008

(65) Prior Publication Data
US 2010/0121858 A1 May 13, 2010

Related U.S. Application Data

(60) Provisional application No. 60/926,967, filed on Apr. 30, 2007.

(51) Int. Cl.
*G06F 17/30* (2006.01)
*G06F 15/16* (2006.01)
*G06Q 30/02* (2012.01)
*G06Q 90/00* (2006.01)

(52) U.S. Cl.
CPC ............... *G06Q 90/00* (2013.01); *G06Q 30/02* (2013.01)
USPC .................... 707/748; 709/206; 707/E17.084

(58) Field of Classification Search
CPC combination set(s) only.
See application file for complete search history.

(56) References Cited

U.S. PATENT DOCUMENTS

| | | | | |
|---|---|---|---|---|
| 2002/0002479 A1* | 1/2002 | Almog et al. | | 705/8 |
| 2002/0128893 A1* | 9/2002 | Farenden | | 705/8 |
| 2003/0182171 A1* | 9/2003 | Vianello | | 705/9 |
| 2005/0080657 A1* | 4/2005 | Crow et al. | | 705/8 |
| 2007/0162323 A1* | 7/2007 | Gorham | | 705/9 |
| 2008/0147630 A1* | 6/2008 | Chu | | 707/5 |

OTHER PUBLICATIONS

International Preliminary Report on Patentability and Written Opinion issued on Nov. 3, 2009 for PCT/EP2008/003524.

* cited by examiner

*Primary Examiner* — Shyue Jiunn Hwa
(74) *Attorney, Agent, or Firm* — McDonnell Boehnen Hulbert & Berghoff LLP

(57) ABSTRACT

The present invention relates to a method for providing a virtual job market on a network comprising an application server and clients and/or electronic message systems allowing to input and output information, wherein the method comprises the following steps: providing primary dimensions information on industries, career levels and functional areas; providing secondary dimensions information on salary ranges and/or geo-data and/or educational information and/or languages and/or special expertises, entering the primary and secondary dimensions information in a three dimensional data base on the application server; collecting information chunks of open jobs and candidate profiles, and placing the information chunks in a distinct cell or number of cells in the three dimensional database. Further, the present invention relates to a system for providing a virtual job market on a network comprising an application server and clients and/or electronic message systems including at least a first database comprising candidate profiles, a second database comprising salary information and a third database comprising job information, wherein the information available in the three databases is matched in a three dimensional database model.

15 Claims, 3 Drawing Sheets job marketplace with unique taxonomy

METHOD AND SYSTEM FOR PROVIDING A VIRTUAL JOB MARKET

FIELD OF INVENTION

The present invention relates to a method and a system for providing a virtual job market on a computer network, preferably on the internet. For providing such a virtual job market, a three dimensional database model is generated.

BACKGROUND OF INVENTION

Commonly, the job market is represented by classified adds—in print or on the internet—onto which a job seeker is reacting or alternatively by Human Recourses recruiters which are placing candidates in certain positions. Recently, virtual job market places were introduced.

U.S. Pat. No. 6,873,964 B1 describes a method for recruiting personnel for a business entity including a plurality of distinct business units each having individual hiring requirements, wherein at least some of the distinct business units' hiring requirements compete for common applicants, the method including the steps of: entering information related to a plurality of hiring needs, each of the plurality of hiring needs being respectively associated with one of the plurality of distinct business units, and information related to a plurality of candidates into a database, respectively; automatically cross-referencing the information related to the plurality of hiring needs with the information related to the plurality of candidates to identify candidates selected the plurality of candidates who satisfy entered information indicative of hiring needs; and, determining which of the identified candidates should be offered a job associated with the hiring needs; wherein, when it is determined that one of the identified candidates should be offered more than one job as determined by the hiring needs, all jobs pertinent to the one of the associated candidates are offered substantially simultaneously to the one of the identified candidates.

U.S. Pat. No. 6,662,194 B1 describes an apparatus and method for providing recruitment information, including a memory device for storing information regarding at least one of a job opening, a position, an assignment, a contract, and a project, and information regarding a job search request, a processing device for processing information regarding the job search request upon a detection of an occurrence of a searching event, wherein the processing device utilizes information regarding the at least one of a job opening, a position, an assignment, a contract, and a project, stored in the memory device, and further wherein the processing device generates a message containing information regarding at least one of a job opening, a position, an assignment, a contract, and a project, wherein the message is responsive to the job search request, and a transmitter for transmitting the message to a communication device associated with an individual in real-time.

WO 01/82181 A2 describes a method and system generating referrals for job positions based upon virtual communities comprised of members relevant to the job positions. This disclosure includes three primary methodical tools. The first tool implements a job recruiting toolkit. The second tool implements a method of generating referrals based upon a virtual community of people who relate to the job description. The third tool implements an enterprise recruitment toolkit.

A major drawback of the existing systems is the lack of additional information regarding industries, career levels and functional areas. Also, in general no salary ranges, etc. are provided for certain jobs.

It is one object of the present invention to overcome the drawbacks of the prior art and to provide a virtual job market place superior to existing methods and technologies.

The method according to claim 1 and the system according to claim 6 of the present invention solve this object and provide a virtual job market place superior to existing methods and technologies. It addresses inefficiencies in the labour market created by inappropriate definition of the labour market and incomplete construction of existing systems.

The present invention involves the following features:

1. Creation of a complete marketplace: combination of labour demand, labour supply and a pricing mechanism (salary information on every job seeker and every job), establishing basic elements of a market place within one closed data system. Note: existing technologies on job markets exclude salary, which in turn creates a demand/supply match without pricing information. A market place without a pricing mechanism cannot create clearance with a period and suffers from imperfect information.
2. Unique structure of the labour market: Combining generally known concepts to a unique combination of dimensions creates a far more complex marketplace, yet easy to understand and more relevant for all participants.

SUMMARY OF THE INVENTION

A comprehensive, distinct, and scalable aggregation of industries and sub-segments as provided by the invention creates a complete virtual job market place of an entire economy. It analyzes and allocates demand and supply of human resource into distinct "commodity markets" and/or segments of the labour market. The secondary dimensions qualify each individual job or profile within this marketplace with the relevant information. In this context the primary dimensions create efficient job marketplaces. The secondary dimensions match demand and supply along the qualitative features and provide the information for more efficient market clearance. This combination is unique, significantly more complex and processes richer data than existing technologies. Yet, due to the "standard nature" of each dimension it is intuitively to understand.

DETAILED DESCRIPTION OF THE INVENTION

Figure 1:
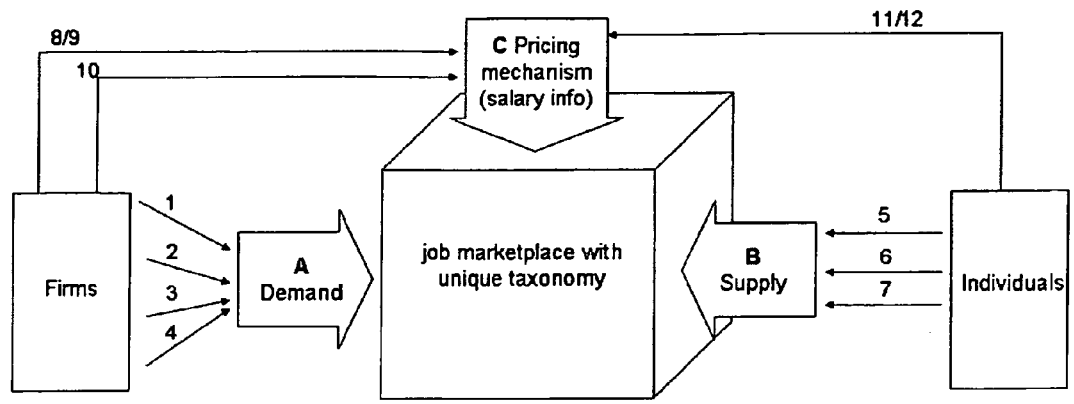
FIG. 1 shows a simplified sketch of a preferred embodiment of the present invention.

The present invention integrates the three defining factors of a market: (A) demand (for labour), (B) supply (of labour) and (C) a pricing mechanism which is provided by the invention. The pricing element, in particular, has traditionally been left out of data-driven labour market applications. The invention creates systems having (i) various functions, (ii) efficient market, and integrates them with (iii) increased transparency and (iv) reduced information pathology FIG. 1 shows a preferred embodiment of the present invention, which will be described as follows.

(A) Demand (Examples):
- (1)/(2) HR Departments, independent recruiters and head-hunters can post job openings according to the marketplace taxonomy (see 2.)
- (3) Direct job aggregation from company websites through xml-interface, manual and/or crawler supported input of job data provided on company career websites
- (4) Head-hunters searching for relevant individuals. Search covers existing job position, career history and career goals (B) Supply (Examples)
- (5) Individuals can search job database
- (6) Individuals define next career steps and receive matching openings
- (7) Individuals can define career profile/CV and set confidentiality levels to be found by head-hunters (C) Pricing—Salary Information (Examples)
- (8)/(10) A firm or a head-hunter leave salary range by posting an opening
- (9) A firm provides an entire salary matrix for all internal levels and all functions (i.e. sales, finance etc.)
- (10) An individual provides his/her existing salary range and current position
- (11) An individual provides his/her desired salary range and desired position The invention organizes data on the job market along the following primary and secondary dimensions:

Primary Dimensions:
- (1) industries
- (2) career levels
- (3) functional areas

Figure 2:
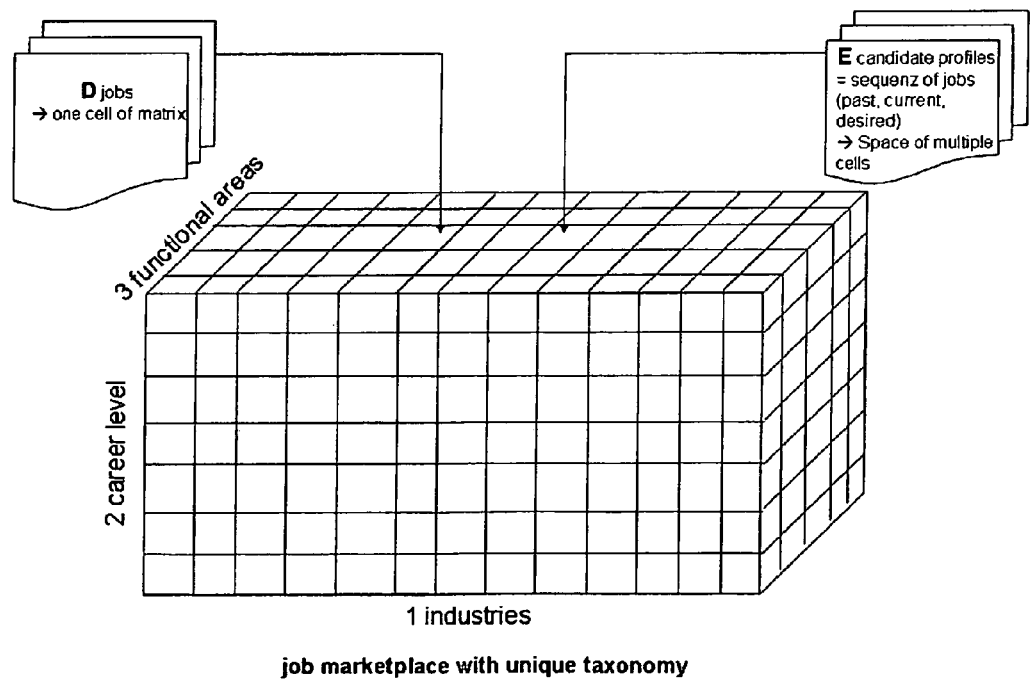
FIG. 2 shows a simplified sketch of a job marketplace with unique taxonomy.

Secondary Dimensions:
- (4) salary ranges
- (5) geo-data (country, city, ZIP code, IP address, GPS data, GSM information)
- (6) educational information
- (7) languages
- (8) special expertises Furthermore, as shown in FIG. 2, the invention collects the following information chunks (jobs/candidate profiles) and places them in a distinct cell or number of cells.

Information Chunks (Jobs/Candidate Profiles)
- (D) open jobs, which are determined by one distinct cell
- (E) candidate profiles, which are a sequence of cells determined by a candidates past jobs, current job and desired future job In the system according to the present invention, the primary dimensions determine the structure of the data repository and place the information chunks (jobs and candidate profiles) in the proper position in the virtual job market established in the database. The secondary dimensions determine the quality of the information chunks. They enable a ranking of competing information chunks in the same job market segment. For example multiple jobs or multiple candidate profiles are placed in the same sub-segment of the virtual job market place, i.e. level—(e.g., "senior professional"), function (e.g., "sales"), and industry (e.g, 'book publishing"). The secondary dimensions (e.g, salary range, special expertise etc.) qualify them in a fashion that generates a clear-cut matching between demand and supply.

The primary dimensions determine the relevant marketplace within the system and distinctly position the job and candidate profile at the appropriate place in the system so that demand and supply can meet. By doing so the model generates a human resource commodity and allocates it to relevant "commodities markets" and/or job market segments. By placing pricing information to the commodity it enables a complete marketplace.

Each of the primary dimensions are intuitive to understand and relate to common understanding and concept adopted by economic theory as well as practice. The innovative aspects of the invention involve the combination of the three dimensions to deliver a contingent system to cover the job market.

(1) Industries and Sub-Segments

The first innovation is to analyse the job market in a very granular fashion according to industries and sub-segments of industries. This is crucial as job market competition by and large takes place as a function of the competition of firms in the markets for products and services. Special skills, know how, contacts and other resources acquired in a very specific industry segment strongly determine the returns a candidate can yield on the job market. This analysis will be conducted automatically as long as the required information is pre-processed according to the systems input rules.

Industries are segmented in multiple levels: 4 levels and maximum 10 entries per level, e.g.:
- 0000 Main Industry 1 (i.e. services)
    - 0100 Segment 1 Level 2 (i.e. media)
        - 0110 Segment 1 Level 3 (i.e. print publishing)
            - 0111 Segment 1 Level 4 (i.e. book publishing)
            - 0112 Segment 2 Level 4 (i.e. trade magazine publishing)
            - 0113 Segment 3 Level 4 (i.e. newspaper publishing)
            - 0114 Segment 4 Level 4 (i.e. special interest magazine publishing)
            - 0115 Segment 5 Level 4 (i.e. general interest magazine publishing)
            - And so forth
        - 0120 Segment 2 Level 3 (i.e. Music)
        - 0130 Segment 3 Level 3 (i.e. TV)
        - and so forth
    - 0200 Segment 2 Level 1 (i.e. Consulting)
    - 0300 Segment 3 Level 1 (i.e. Financial Services)
    - and so forth
- 1000 Main Industry 2
- 2000 Main Industry 3
- and so forth (2) Career Levels Career Levels give an abstract representation of hierarchy, which exists in every company. To apply this invention the career levels should be customized depending on the target market. i.e. in the current application the following levels are distinguished for a market of very qualified white collar professionals and executives:
- executive management midsized and large companies
- executive management small companies
- business unit mgmt
- senior management
- management
- senior professional
- professional
- junior professional/entry level (3) Functional Areas Functional areas determine in which value-creating part of firm—or "where in the value chain"—a job is positioned. The concept of the value chain is generally accepted to describe all sorts of businesses and its internal functional organization, i.e. sales, research, development, production etc. Today the taxonomy of the value chain is understood common sensually in developed economies.

For each industry the combination of 2-career levels and 3-functions establishes a matrix. Within this matrix various salary data can be calculated, such as salary ranges or average mid-points. In the following example, table 1, average mid-points are calculated.

TABLE 1

Industry: Segment 0000

| Function | | Entry Level 1 | Professional 2 | Senior Professional 3 | Manager 4 | Senior Manager 5 | Business Unit Manager 6 | Executive Board medium/large company) 7 | Executive Board (small company) 8 |
|---|---|---|---|---|---|---|---|---|---|
| Management | 1 | | | | | | 150 | 150 | 200 |
| Planing, Controlling | 3 | 40 | 50 | 65 | 90 | 120 | 140 | | |
| PR | 12 | 35 | 47 | 60 | 80 | 100 | 120 | | |
| Finance, Accounting | 4 | 40 | 55 | 70 | 90 | 120 | 140 | | |
| Legal | 5 | 40 | 55 | 70 | 90 | 120 | 140 | | |
| HR | 6 | 35 | 45 | 60 | 80 | 100 | 120 | | |
| Administration | 7 | 35 | 45 | 60 | 80 | 100 | 120 | | |
| IT, Telecom | 13 | 45 | 55 | 70 | 90 | 120 | 140 | | |
| Purchasing, Logistics | 8 | 40 | 55 | 70 | 90 | 120 | 140 | | |
| Customer Support | 15 | 35 | 40 | 55 | 65 | 85 | 100 | | |
| Production | 9 | 45 | 60 | 70 | 90 | 110 | 130 | | |
| Consulting | 16 | 45 | 60 | 70 | 90 | 120 | 140 | | |
| Design | 17 | 45 | 55 | 65 | 80 | 110 | 130 | | |
| Documentation | 18 | 45 | 55 | 65 | 90 | 110 | 130 | | |
| R&D | 14 | 45 | 60 | 75 | 90 | 120 | 140 | | |
| Sales | 10 | 40 | 60 | 75 | 90 | 150 | 180 | | |
| Marketing | 11 | 45 | 55 | 70 | 90 | 120 | 140 | | |
| Strategy, M&A | 2 | 55 | 70 | 90 | 120 | 150 | 200 | | |

The following secondary dimensions provide for job market-specific qualification of information chunks (e.g., open jobs, candidate profiles). By adding these informational dimensions, the human resource commodity allocated to a sub-segment of the labour market gets "de-commoditized" for the specific sub-segment of the labour market by adding qualitative information. This is important to assess the yield (salary potential) a specific job or candidate has in the relevant target market.

(4) Salary Ranges

Salary ranges, representative for a market can be set up, whereas overlapping ranges created a perception, which prevents users from overstating their current salary as shown in Table 2.

TABLE 2

| id | no | label | min_salary | max_salary |
|---|---|---|---|---|
| | | - current salary - | | |
| 13 | 2 | 50.000-60.000 EUR | 50000 | 60000 |
| 1 | 3 | 55.000-65.000 EUR | 55000 | 65000 |
| 2 | 4 | 60.000-70.000 EUR | 60000 | 70000 |
| 3 | 5 | 65.000-75.000 EUR | 65000 | 75000 |
| 4 | 6 | 70.000-80.000 EUR | 70000 | 80000 |
| 5 | 7 | 75.000-85.000 EUR | 75000 | 85000 |
| 6 | 8 | 80.000-90.000 EUR | 80000 | 90000 |
| 7 | 9 | 85.000-105.000 EUR | 85000 | 105000 |
| 8 | 10 | 90.000-110.000 EUR | 90000 | 110000 |
| 9 | 11 | 100.000-130.000 EUR | 100000 | 130000 |
| 10 | 12 | 120.000-150.000 EUR | 120000 | 150000 |
| 11 | 13 | >150.000 EUR | 150000 | 200000 |
| 12 | 14 | >200.000 EUR | 200000 | |
| | | -desired salary/job posting salaries | | |
| 8 | 1 | >60.000 EUR | 60000 | 70000 |
| 1 | 2 | >70.000 EUR | 70000 | 80000 |
| 2 | 3 | >80.000 EUR | 80000 | 90000 |
| 3 | 4 | >90.000 EUR | 90000 | 100000 |
| 4 | 5 | >100.000 EUR | 100000 | 120000 |
| 5 | 6 | >120.000 EUR | 120000 | 150000 |
| 6 | 7 | >150.000 EUR | 150000 | 200000 |
| 7 | 8 | >200.000 EUR | 200000 | |

(5) Geodata (Country, City, ZIP Code)

Each open job or current/past job in a candidate profile needs to be defined geographically, where the global ZIP code systems provides a sufficiently rich system (6) Educational Information Educational information is defined along two data dimension: (i) study major, (ii) highest degree per major.

(7) Languages

Language information is defined along two data dimension: (i) language (ii) level of proficiency (8) Special Expertises In this field, certain free text data entry may be allowed to permit special expertise to be noted In a preferred embodiment, the databases themselves are maintained on an Application Server which is accessed by the stated demand- or supply-side users. Information is input, e.g. using pull-down menus or free-text data entry, where permitted. The application server calculates, based on the information input by the user, a specific job position within the matrix and correlates specific pricing information, which may include salary ranges, median salary, etc.

The present invention may be used with Internet access technologies. This covers end user interfaces to the system of the present invention as well as machine-to-machine interfaces. Alternatively other network solutions may be used.

The end user interfaces may be browser-based, whereas the invention supports both desktop/laptop and mobile browsers. In this case the IP address information may be used as geo-data information. Messaging interfaces may support e-mail or SMS. When using mobile phones as interface, the available GSM or GPS position information may be used as geo-data information. The user interface related geo-data information may be used to verify the geo-data information provided by a job candidate and/or as access control means. Alternatively, other systems, such as voice-activated telephone services, may be used as interface.

Figure 3:
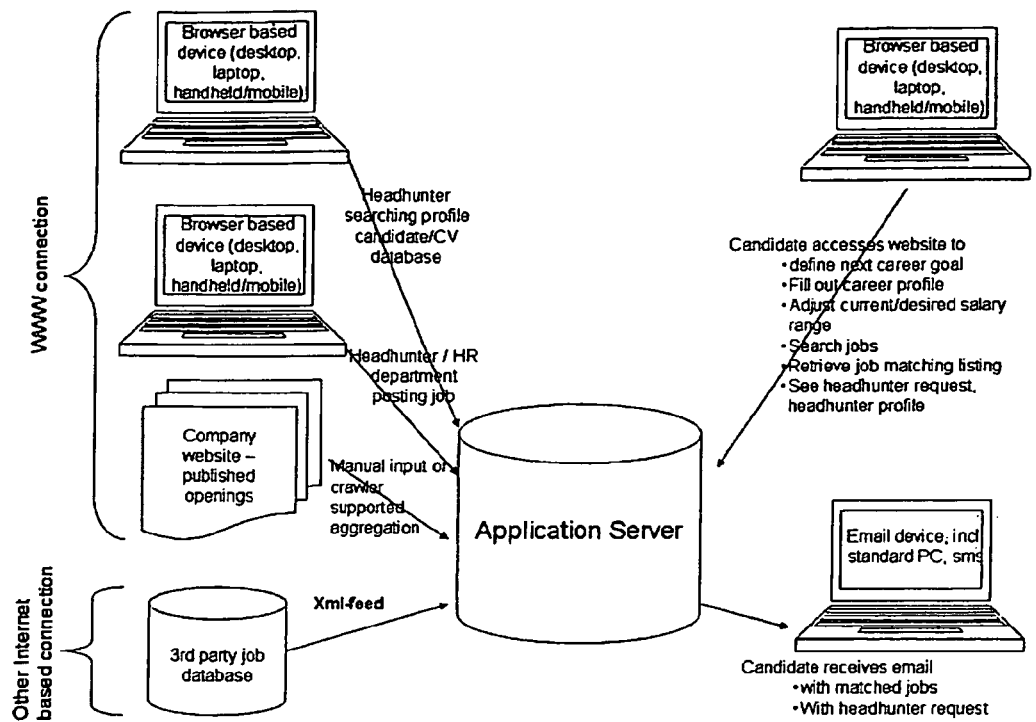
FIG. 3 shows a simplified sketch of machine-to-machine interfaces.

As shown in FIG. 3, machine-to-machine interfaces may be used with API's for xml-feeds or crawlers that automatically access end user interfaces of web sites and pull data.

Figure 4:
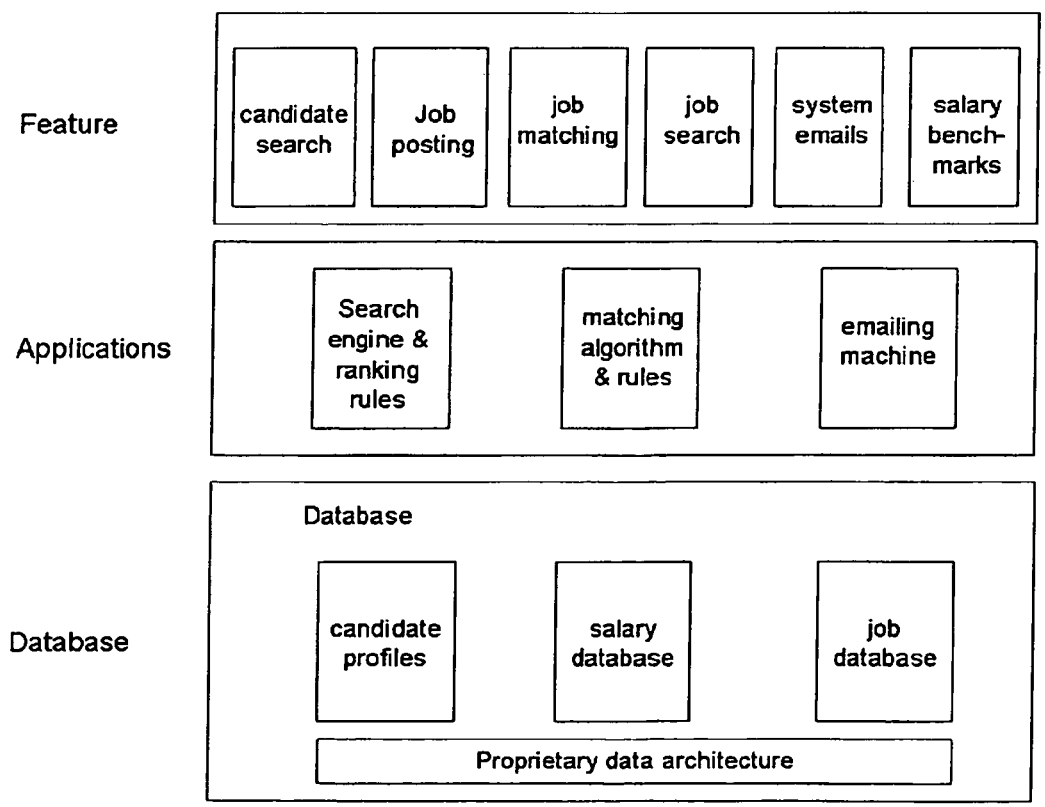
FIG. 4 shows a simplified sketch of one example of the architecture that may be used for the application.

One example of the architecture of that may be used for the application is described in FIG. 4.

The positions within the job matrix may be limited to specified categories (e.g., 250 three-dimensional matrix positions/clusters), whereupon each position inquiry is forced into these positions. This allows the precise definition of each position and provides a more reliable specification of the provision, and therefore a more reliable pricing. It would also avoid double postings, making it less likely that the two different positions could define the same job.

Each job being accessible via system gets an individual salary-benchmark information (in the following: SBI). For postings entered directly by HR representatives of a company or by Head hunters, the SBI is created by the posting person himself, selecting the appropriate SBI level out of a proposed range-list. For postings being collected and categorised by systems to be accessible to the creators corporate website or his commissaries, the SBI is calculated automatically out of the system. The calculation of the SBI follows a process of job-categorisation along primary dimensions including industry, function, career level and secondary dimension like geographical factor (i.e. CIP code) or company size. Data sources of the salary database are:
1. external empirical information
    surveys and data of national statistic offices (distribution of income, GDP per capita etc.)
    agencies providing salary information
    Corporate compensation information
2. internal information:
    End user of the system insert salary information by
    (a) Posting a job (HR departments or recruiters) and attaching salary information along with the primary and secondary dimensions applicable to a job.
    (b) inserting candidate profile information, where an end user fills out its CV data and attaches a salary information to its current position, which is coded with the primary and secondary dimensions applicable to the respective job. (note: With every registration to the system of the present invention, the user has to select the annual gross-earnings of his last years profession out of a suggestions list offering defined ranges of earnings. When filling in an individual profile on the system—the system gathers the information of the current position corresponding to the date of sign-up including the dimensions of industry, function, career level and geographical factor of the individual position.)

The permanent analysis of all gathered user-information enables the system to provide an automatic and permanent adjustment of all salary-matrix information. Calculation algorithms used are based on statistical models as well as on averaging.

Figure 5:
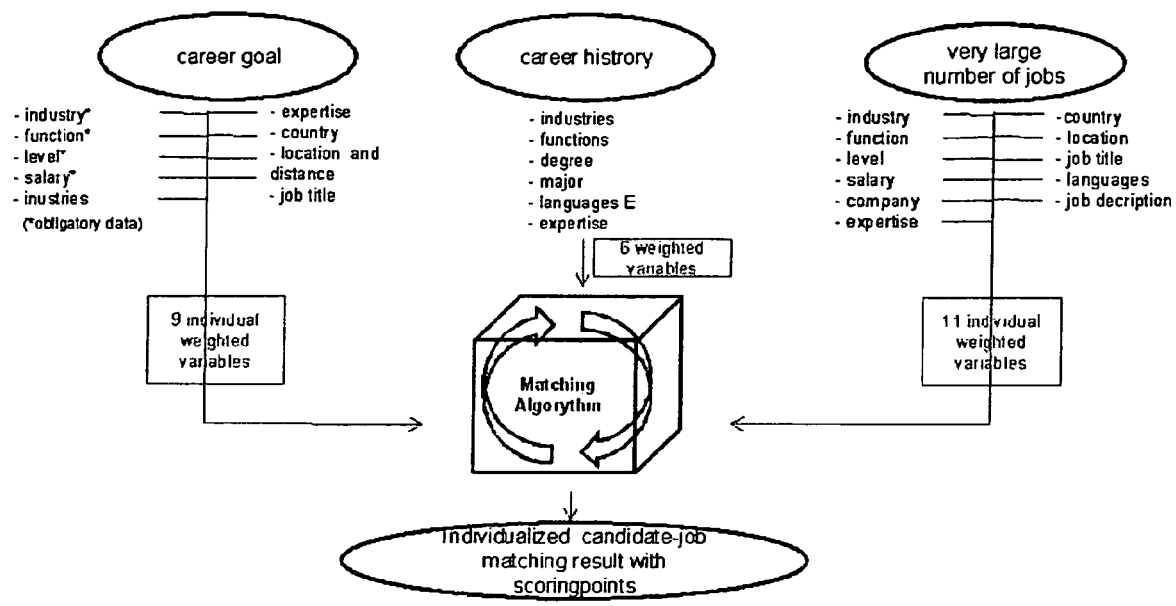
FIG. 5 shows a simplified sketch of a matching process used in another preferred embodiment of the present invention.

Another preferred embodiment of the present invention involves a so called matching process. The matching process provides a selection of relevant positions for a candidate, that is superior to the results of a search for a given list of criteria. This is shown in FIG. 5.

As a prerequisite, a candidate provides information about the positions, he/she is interested in by
    describing one or more career goals
    A minimum information of at least one of career level or salary expectations and one of targeted industries or functional area must be provided.
    Besides this information additional data like the names of companies the candidate is interested in, a list of expertises a candidate seeks to use, a list of countries and an area defined by a location and distance can be provided depending on the preferences of the candidate.
    describing his/her job history
    A candidate describes his professional experience by providing data on the positions he/she worked at. The system therefore knows about past functions and industries the candidates is experienced in.
    describing general expertises and skills
    A candidate lists special expert skills that makes him stand out from other candidates.
    describing her/his education
    describing the list of languages she/he is familiar with
    For positions a list of classifications is maintained:
    the industry
    the functional area
    career level
    the salary benchmark for the position
    the company
    the location
    required languages
    required education
    the description of the position The matching process scores each position held in the system by comparing it's classification to the candidates direct (by career goal) and indirect (by the description of his/her history) description of the positions she/he is interested in. Matching is done for each career goal of the user independently.

Scoring uses a configurable system of weighting factors.

Weighting factors reflect the relative importance of the entered criteria.

Factors for industries and functions further depend on the values provided: the relative weight for industry matches and function matches depends on the functions in question, since some functions allow for easily changing the industry while others don't.

Weighting factors also distinguish between data provided in the career goal and data provided in the history of a candidate since the former is more relevant for the results a user seeks.

Depending on the input provided, a maximum score is calculated and a threshold is derived from this maximum score.

The dynamic calculation of the maximum and threshold scores allows to adapt the system to different degrees of user input. While the system works best for detailed career goals and history data, results are provided for brief goals with minimum input and no job history as well.

All positions that qualify for a score larger than the threshold are considered a match.

Within all matches the score provides a ranking criterion. A larger score means a better fit to the candidates interests.

The matching is implemented as a search for any of the information provided by the user using a full text index of the positions containing all information on the positions.

Thus all positions that do not have any overlap with the candidates matching criteria, that is positions that have a score of 0, are excluded from the matching process from the beginning.

All other positions that fit at least one criteria are scored in the sense described above.

Criteria—such as location and distance—that cannot be searched on a full text index, is implemented by filtering the result and modifying the score appropriately.

Finally the result list is filtered by removing all results having a score less than the required threshold score.

Matching provides results that are superior to the results of searching a number of criteria provided by the user as
    the results of such a search are included in the matching result perfect matches will have the highest score and occur first, when sorting by score
    matching provides results that fail to fulfil all criteria but still are close to the characteristics a user searches for. These matches are likely to be relevant to the user as well.
    This allows to see chances in the proximity of the precise goal definition that would be invisible else.
    This is especially helpful for users where no perfect matches exist, that is users that would get an empty result in the case of a simple search.

Matching thus provides sophisticated means to enable the user to find relevant positions.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed.

The invention claimed is:

1. A method for providing a virtual job market within industries on a network comprising an application server and clients or electronic message systems allowing to input and output information, using a career goal input by a user, a personal history input by said user, or both, wherein the method comprises the following steps:
   a) Providing primary dimensions information based on segmented industries, career levels and functional areas, wherein each segmented industry is segmented into multiple levels, said career levels are established by segmenting careers within a target market for job positions into a ranked series of levels to establish a hierarchy of career levels in said market, and said functional areas are established by segmenting job functions within firms in said industry into multiple defined functional areas;
   b) Providing secondary dimensions information that includes one or more factors selected from the group of salary ranges, geo-data, educational information, languages, and special expertises,
   c) Entering the primary and secondary dimensions information in a three dimensional data base on the application server;
   d) Collecting information chunks of open job positions,
   e) Collecting candidate profiles,
   f) Placing the information chunks in a distinct cell or number of cells in the three dimensional database,
   g) applying said secondary dimension information to said information chunks in said cells of said matrix to rank competing information chunks in at least the same career level and functional area,
   h) performing a matching process for said user comprising scoring each job position by comparing criteria comprising said segmented industry levels, position levels, functional areas, and secondary dimension data to one or more items of personal information input by said user using a weighting process based on a perceived importance and relevance of said criteria to obtain a score and using a full text index of job positions containing all information on the job positions, and
   i) using one or more resulting scores, reporting a result list of job positions derived from said matching process to the user.

2. The method of claim 1, further comprising an application for electronic messaging communication for receiving electronic job requests or automatically contacting a job candidate when a matching position is found.

3. The method according to claim 1, wherein collecting information chunks of open jobs is performed through xml-interface, manual or crawler supported input of job data provided on company career websites.

4. The method according to claim 1, comprising the dynamic calculation of a maximum score depending on detailed or minimum input of career goals and history data and deriving a threshold score from said maximum score.

5. The method according to claim 1, further comprising implementing electronic messaging communication for receiving electronic job requests and automatically contacting a job candidate once a matching position was found.

6. A method for providing a virtual job market within industries on a network comprising an application server and clients or electronic message systems allowing input and output of information using a career goal input by a user, personal information such as a personal history input by said user, or both, wherein the method comprises the following steps:
   a) segmenting each industry into multiple levels;
   b) segmenting careers within a target market for job positions into a ranked series of levels to establish a hierarchy of career levels in said market;
   c) segmenting job functions within firms in said industry into multiple defined functional areas;
   d) within each industry level, creating a matrix made up of cells using said career levels and functional areas, wherein each cell corresponds to a potential job position;
   e) collecting information chunks of job positions and of candidate profiles and placing said information chunks in one or more cells of said matrix;
   f) applying secondary dimension data made up of one or more of salary ranges, geo-data, education information, languages or special expertises to said information chunks in said cells of said matrix to rank competing information chunks in the same career level and functional area;
   g) performing a matching process for said user comprising scoring each job position by comparing criteria comprising said segmented industry levels, position levels, functional areas, and secondary dimension data to one or more items of personal information input by said user using a weighting process based on the importance and relevance of said criteria to obtain a score and using a full text index of job positions containing all information on the job positions; and
   h) using one or more resulting scores, reporting a result list of job positions derived from said matching process to the user.

7. The method of claim 6 further comprising implementing the matching process by scoring each job position assigned to a cell.

8. The method of claim 6 further comprising giving said score to all job positions that match at least one item of personal information input by said user using said weighting process.

9. The method of claim 6 further comprising accounting for any criteria that cannot be searched on a full text index by filtering the result and modifying the score.

10. The method of claim 9 further comprising filtering the result list for job positions that exceed the threshold score.

11. The method of claim 6 further comprising establishing a maximum score for the job position whose criteria on a weighted basis most closely matches the items of personal information input by the user and deriving a threshold score from said maximum score.

12. The method of claim 6 further comprising performing a matching process for said user comprising scoring each job position held in the system to both said career goal and said personal information input by said user and reporting result lists of job positions derived from said matching process to the user based on both said criteria and said personal information input by said user.

13. The method of claim 6, wherein collecting information chunks of open jobs is performed through xml-interface, manual or crawler supported input of job data provided on company career websites.

14. The method of claim 6, further comprising automatically contacting a job candidate when a matching job position is found.

15. The method of claim 6 further comprising automatically providing individual salary benchmark information for each job position that does not have an associated salary.

* * * * *